United States Patent
Brown et al.

(10) Patent No.: US 9,294,451 B2
(45) Date of Patent: Mar. 22, 2016

(54) DIGITAL RIGHTS TAGGING SYSTEM AND METHOD

(71) Applicant: Google Technology Holdings LLC, Mountain View, CA (US)

(72) Inventors: David S. Brown, North Andover, MA (US); Lorin F. Decker, Elkins Park, PA (US); Mark G. Depietro, Harleysville, PA (US); Sean P. Matthews, Doylestown, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/209,060

(22) Filed: Mar. 13, 2014

(65) Prior Publication Data
US 2014/0281557 A1  Sep. 18, 2014

Related U.S. Application Data

(60) Provisional application No. 61/781,206, filed on Mar. 14, 2013.

(51) Int. Cl.
*H04L 29/06* (2006.01)
*G06Q 99/00* (2006.01)

(52) U.S. Cl.
CPC ............ *H04L 63/0457* (2013.01); *G06Q 99/00* (2013.01)

(58) Field of Classification Search
USPC ......................................................... 713/176
See application file for complete search history.

(56) References Cited

U.S. PATENT DOCUMENTS

| | | | | |
|---|---|---|---|---|
| 5,214,702 | A * | 5/1993 | Fischer | 380/30 |
| 6,513,118 | B1 * | 1/2003 | Iwamura | 713/176 |
| 7,120,687 | B1 * | 10/2006 | Tessman et al. | 709/224 |
| 7,216,232 | B1 * | 5/2007 | Cox et al. | 713/176 |
| 7,631,193 | B1 * | 12/2009 | Hoffman | 713/186 |
| 8,059,882 | B2 | 11/2011 | Amidi | |
| 8,441,574 | B2 * | 5/2013 | Dunn et al. | 348/460 |
| 2002/0010627 | A1 * | 1/2002 | Lerat | 705/14 |
| 2002/0138733 | A1 * | 9/2002 | Ishibashi et al. | 713/176 |
| 2004/0091111 | A1 * | 5/2004 | Levy et al. | 380/202 |
| 2005/0038756 | A1 * | 2/2005 | Nagel | 705/76 |
| 2005/0289061 | A1 * | 12/2005 | Kulakowski et al. | 705/50 |
| 2008/0177665 | A1 | 7/2008 | Noordam | |
| 2009/0070122 | A1 | 3/2009 | Hauck et al. | |
| 2010/0096444 | A1 | 4/2010 | Cummings et al. | |
| 2010/0278381 | A1 * | 11/2010 | Tessman et al. | 382/100 |
| 2011/0161117 | A1 | 6/2011 | Busque et al. | |
| 2013/0226609 | A1 * | 8/2013 | Pourfallah et al. | 705/2 |

OTHER PUBLICATIONS

Purchase digital items in social networking|http://www.researchgate.net/profile/Hee_Woong_Kim/publication/220652461_Investigating_the_intention_to_purchase_digital_items_in_social_networking_communities_A_customer_value_perspective/links/5494e9390cf20f487d2c490b.pdf|Kim et al|Pages 228-234|2011.*

* cited by examiner

*Primary Examiner* — Mahfuzur Rahman
(74) *Attorney, Agent, or Firm* — Fenwick & West LLP

(57) ABSTRACT

A system is provided that includes a receiving component a first encrypting component and a second encrypting component. The receiving component can receive, from a first user, item identification data based on a tangible item and an ownership verification indicator. The receiving component can also receive, from the first user, image data based on the tangible item. The first encrypting component can generate encrypted item identification data based on the item identification data. The second encrypting component operable to generate encrypted image data based on the image data. The resultant set of encrypted information is stored so as to associate the image and the ownership data for use later as proof of ownership of an item and its associated rights.

20 Claims, 4 Drawing Sheets

| 402 USERS | 404 ITEM | 406 DATE | 408 LOCATION | 410 DEVICE | 412 PHOTO/ VIDEO | 413 UNIQUE IDENTIFIER |
|---|---|---|---|---|---|---|
| USER A USER B | LAPTOP | 9/1/12 | 12.3456 -98.7654 | SMART PHONE | PHOTO | 012rfc45t |
| | BOOK | 9/2/12 | 12.3456 -98.7654 | SMART PHONE | VIDEO | 987oierjot |
| | ALBUM | 10/15/12 | 12.3456 -98.7654 | CAMERA | PHOTO | sdf903lple |
| USER C | JEWELRY | 9/7/12 | 424343 77.4591 | CAMERA | VIDEO | nkjoi3461 |

DIGITAL RIGHTS TAGGING SYSTEM AND METHOD

BACKGROUND

In most cases, people have great emotional attachment to material items that they deem valuable. Accordingly, a person may want to document the ownership and condition of items as a record in the event a list of items is needed for an insurance claim or transaction. If a person's home is in a fire, it may be difficult to recall all items lost from memory when making an insurance claim. Having a list of all items owned as well as their condition in a secure storage space would prove valuable when making an insurance claim.

In another example, a user may have a collection of old record albums (LPs) that they would like to purchase in digital format. In this case, if the person can document that they already own the album, they may be able to purchase the same album in a different format at a discounted price or even obtain the album for free.

BRIEF SUMMARY OF THE DRAWINGS

The accompanying drawings, which are incorporated in and form a part of the specification, illustrate example embodiments and, together with the description, serve to explain the principles of the disclosure. In the drawings.

DETAILED DESCRIPTION

Described herein are a system and method for using an ownership verification indicator to create identification and photo/video data of a tangible item that can be stored on a secure storage device.

In accordance with aspects of the system and method disclosed herein, a device is provided for use with a plurality of tangible items. The system includes a secure hash function component, an encryptor, and a secure storage device. The secure hash function component is arranged to send encrypted identification data to a secure storage device. The encryptor is arranged to send encrypted photo/video data of the object being tagged to a secure storage device.

Additional advantages and novel features are set forth in part in the description which follows, and in part will become apparent to those skilled in the art upon examination of the following or may be learned by practice of the system and method in accordance with the present disclosure. The advantages of the system and method in accordance with the present disclosure may be realized and attained by means of the instrumentalities and combinations particularly pointed out in the appended claims.

Figure 1:
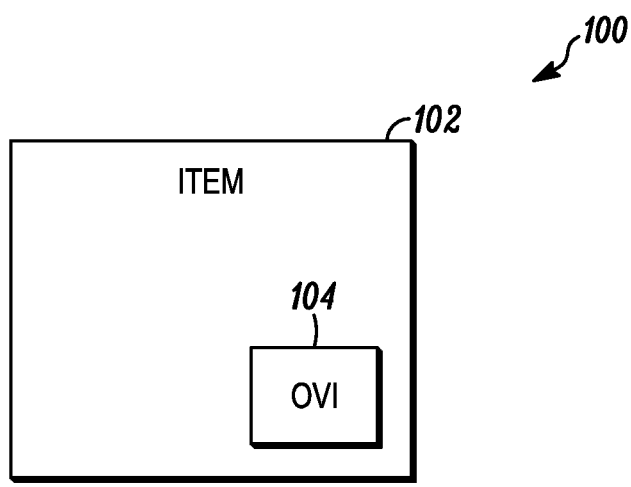
FIG. 1 illustrates an example ownership verification system.

FIG. 1 illustrates an item ownership verification system 100.

As illustrated in the figure, ownership verification system 100 includes an item 102 to be tagged and an ownership verification indicator 104.

Item 102 may be an item that a user owns and wants to catalog for future reference. Non-limiting examples of an item include jewelry, furniture, appliances or a photographic or music album. Ownership verification indicator (OVI) 104 is operable to be an ownership verification indicator that is unique to the user. Non-limiting examples of a verification indicator include an RFID tag, a bar code, and a fingerprint.

In operation, a user will want to document ownership and the condition of an item. In one example embodiment, a user may want to document ownership and condition of items in their home for an insurance claim in the case of a fire, flood, earthquake, hurricane, or theft. In another example embodiment, a user may want to document the ownership and condition of an item to establish digital rights, non-limiting examples of which include ownership, permitted use, etc., and/or to avoid buying the item again. Suppose, for example, a user has a collection of music albums and wants to get the music albums in a digital format. If the user is able to verify ownership of the music album, they may be able to purchase the digital version of the same music album at a discounted price. In yet another example embodiment, a user may want to document the ownership and condition of a collectible item. If a user has such a collection of items and they would like to sell, it would be beneficial to provide proof of ownership and condition of the collection to potential buyers.

First, a user will obtain OVI 104, which in this example, is a bar code. OVI 104 may be generated by the user or given to the user by a third party, such as an insurance company.

The user will place OVI 104 on item 102, once OVI 104 has been placed, the user will record item 102 with OVI 104 using a recording device. A recording device may be any device that is capable of recording an image as well as identification data. Non-limiting examples of a recording device include a video recorder, camera, or imagers and imaging sensors within gaming devices, television displays, tablet displays, and smart phones. Non-limiting examples of identification data includes a unique device identifier (for example, a serial number), position data, date data, time data and password data.

Once a record has been made, the user can then upload the record of item 102 with OVI 104 to a secure storage device.

The uploading of a record of item 102 will now be further described with reference to FIG. 2.

Figure 2:
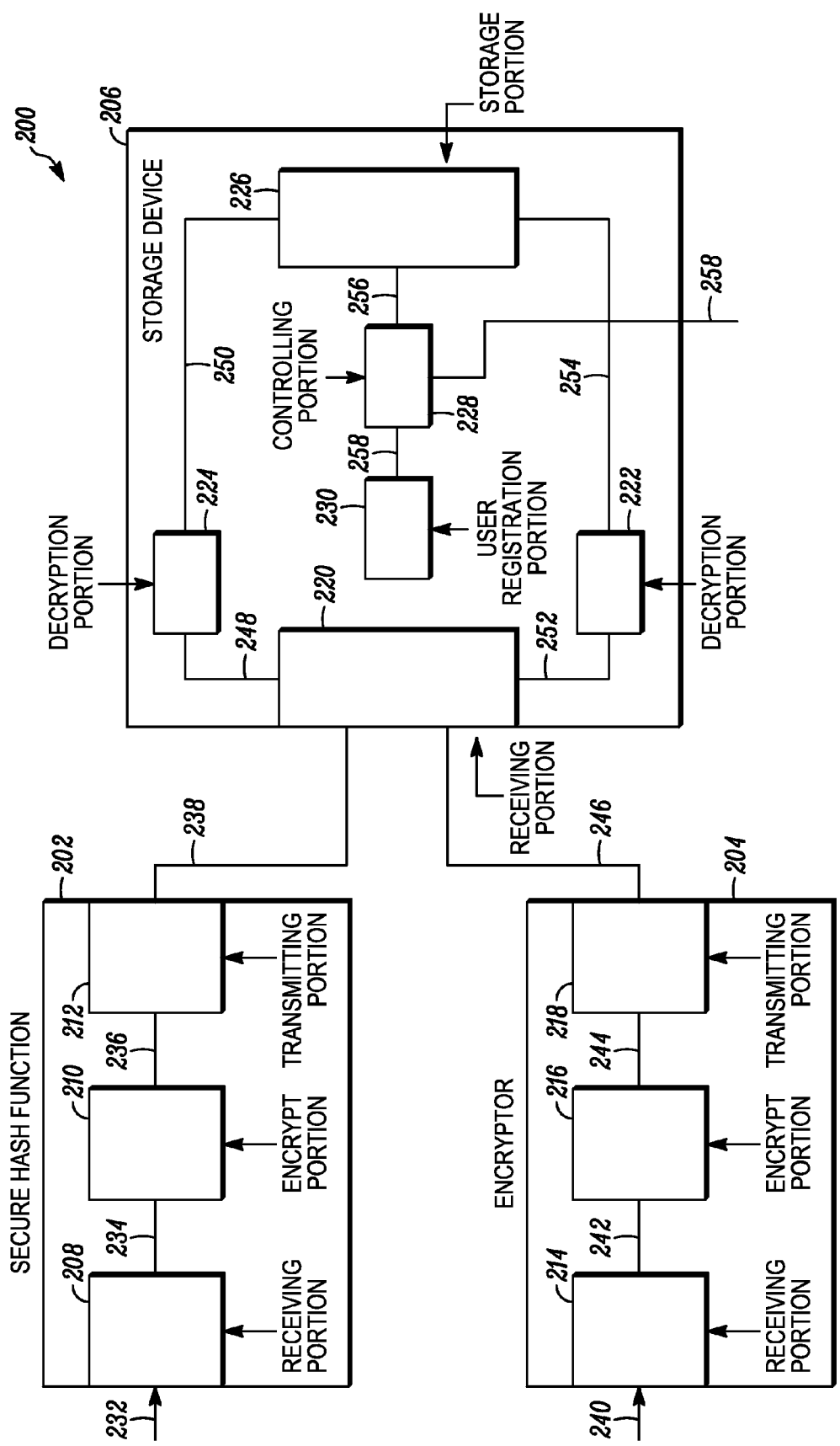
FIG. 2 illustrates an example storage system.

FIG. 2 illustrates an example storage system 200.

As illustrated in the figure, item record storage system 200 includes a secure hash function component 202, an encryptor 204, and a storage device 206. Secure hash function component 202 further includes a receiving component 208, an encrypting component 210, and a transmitting component 212. Encryptor 104 further includes a receiving component 214, an encrypting component 216, and a transmitting component 218. Storage device 206 further includes a receiving component 220, a decryption component 222, a decryption component 224, a storage component 226, a controlling component 228, and a user registration component 230.

In this example, each of secure hash function component 202, encryptor 204, storage device 206, receiving component 208, encryption component 210, transmitting component 212, receiving component 214, encryption component 216, transmitting component 218, receiving component 220, decryption component 222, decryption component 224, storage component 226, controlling component 228, and user registration component 230 are distinct devices. However, in other embodiments, at least two of secure hash function component 202, encryptor 204, storage device 206, receiving component 208, encryption component 210, transmitting component 212, receiving component 214, encryption component 216, transmitting component 218, receiving component 220, decryption component 222, decryption component 224, storage component 226, controlling component 228, and user registration component 230 may be combined as a unitary device. Further, in some embodiments, at least one of secure hash function component 202, encryptor 204, storage device 206, receiving component 208, encryption component 210, transmitting component 212, receiving component 214, encryption component 216, transmitting component 218, receiving component 220, decryption component 222, decryption component 224, storage component 226, controlling component 228, and user registration component 230 may be implemented as non-transient, tangible computer-readable media for carrying or having computer-executable instructions or data structures stored thereon. Such non-transient, tangible computer-readable media can be any available media that can be accessed by a general purpose or special purpose computer. Non-limiting examples of non-transient, tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (hardwired and/or wireless, or a combination of hardwired or wireless) to a computer, the computer properly views the connection as a non-transient, tangible computer-readable media computer-medium. Thus, any such connection is properly termed a non-transient, tangible computer-readable medium. Combinations of the above should also be included within the scope of non-transient, tangible computer-readable media.

Secure hash function component 202 is operable to receive identification data from a user via receiving component 208 and a signal 232. Secure hash function component 202 is further operable to encrypt identification data via encryption component 210. Secure hash function component 202 is further operable to output encrypted identification data to secure storage device 206 via transmitting component 212 and a signal 238.

Hash function generator 202 is operable to generate encrypted item identification data as hashes of a second bit length, based on item identification data of a first bit length, wherein the second bit length is less than the first bit length.

Encryptor 204 is operable to receive photo/video data from a user via receiving component 214 and a signal 240. Encryptor 204 is further operable to encrypt photo/video data via encryption component 216. Encryptor 204 is further operable to output encrypted photo/video data to secure storage device 206 via transmitting component 218 and a signal 246.

Receiving component 208 and receiving component 214 are operable to receive, from a user (not shown) via signals 232 and 240, respectively, item identification data based on a tangible item and an ownership verification indicator and to receive, from the user, image data based on the tangible item.

Encryption component 210 is operable to generate the encrypted item identification data based on one of a group consisting of a unique device identifier, position data, date data, time data, device identifier data, password data and combinations thereof. Encryption component 216 is operable to generate the encrypted item image data, based on the image data.

Receiving component 220 of storage device 206 is operable to receive encrypted identification data from secure hash function component 202 via signal 238 and to receive encrypted identification data from encryptor 204 via signal 246. Storage device 206 is additionally operable to decrypt identification data via decryption component 224 and decrypt photo/video data via decrypt component 222.

Storage device 206 is additionally operable to store decrypted identification and photo/video data in storage component 226 based on instructions from controlling component 228 and user registration 230.

Decryption component 222 is operable to generate item identification data from the encrypted item identification data. The item identification data may include at least one of a group consisting of a unique device identifier, position data, date data, time data, device identifier data, password data and combinations thereof. Decryption component 224 is operable to generate, from the encrypted image data, the image data.

Controlling component 228 is operable to associate a component of storage component 226 with a first user based on a signal from user registration component 230. Controlling component 228 is additionally operable to associate a portion of storage component 226 with a second user based on a signal from user registration component 230.

Storage component 226 is operable to store a table of items, item identification data, and photo/video data.

A secure hash function works by creating a digest from a message file using a one way hash function. Once the digest is created it is encrypted with the private part of a public/private key pair. Once encrypted the digest is sent to a recipient.

Upon receiving the encrypted digest, the recipient uses the public key to decrypt the encrypted message back into the original digest. The recipient then computes a new digest from the transmitted file and compares the two digests to see if they match. If they do match, the file was not tampered with; because of the hash function construction even small changes in a file will create significantly different digests.

In operation, a user will want to document ownership and condition of an item. First a user will create photo/video data as well as identification data as described above with reference to FIG. 1. Once photo/video data and identification data have been created, a user will send the identification data to secure hash function component 202 via signal 232 and the photo/video data to encryptor 204 via signal 240.

Identification data is received by receiving component 208 of secure hash function component 202. Receiving component 208 then sends the identification data to encryption component 210 via signal 234. Encryption component 210 encrypts the identification data and then sends the encrypted identification data to transmitting component 212 via signal 236. Once received, transmitting component 212, transmits encrypted identification data to storage device 206 via signal 238.

Simultaneously, receiving component 214 of encryptor 204, receives photo/video data, via signal 240, from a user that is associated with the identification data sent to secure hash function component 202. Once received, receiving component 214 sends the photo/video data to encryption component 216 via signal 242. Encryption component 216 encrypts the photo/video data and then sends the encrypted photo/video data to transmitting component 218 via signal 244. Once received, transmitting component 218 transmits encrypted photo/video data to storage device 206 via signal 246.

A secure storage device is a device that allows the storage of identification and photo/video data at an off-site location. In the event of a local fire, an off-site storage device would not be damaged or broken and the record of items would still be usable, hence secure. In this example, storage device 206 is a cloud based storage device.

At this time, receiving component 220 receives the encrypted identification data and the encrypted photo/video data. Receiving component 220 then sends the encrypted identification data to decryption component 224 via signal 248. Decryption component 224 decrypts the identification data and sends the decrypted identification data to storage component 226 via signal 250.

Simultaneously, receiving component 220 sends the encrypted photo/video data to decryption component 222 via signal 252. Decryption component 222 decrypts the photo/video data and then sends the decrypted photo/video data to storage component 226 via signal 254.

Once storage component 226 receives the decrypted identification and photo/video data, it informs controlling component 228 that it has received data from a user. At this point, controlling component 228 will check with user registration component 230 to identify the user and find the location of the storage space for that particular user within storage component 226. Once the user and storage space have been located, controlling component 228 will instruct storage component 226 to store the identification and photo/video data in the users designated space. The storage of identification and photo/video data within a table will be further described with reference to FIG. 4.

At some later time, a user may want to access the table containing stored items. A user will enter a password associated with that particular table via signal 258. Controlling component 228 will check the password given by the user against the password in user registration component 230. If the passwords do not match, controlling component 228 will deny access to the table. If the passwords match, controlling component 228 will allow access to the table so a user may retrieve a copy of documented items as well as identification and photo/video data associated with each item.

Figure 3:
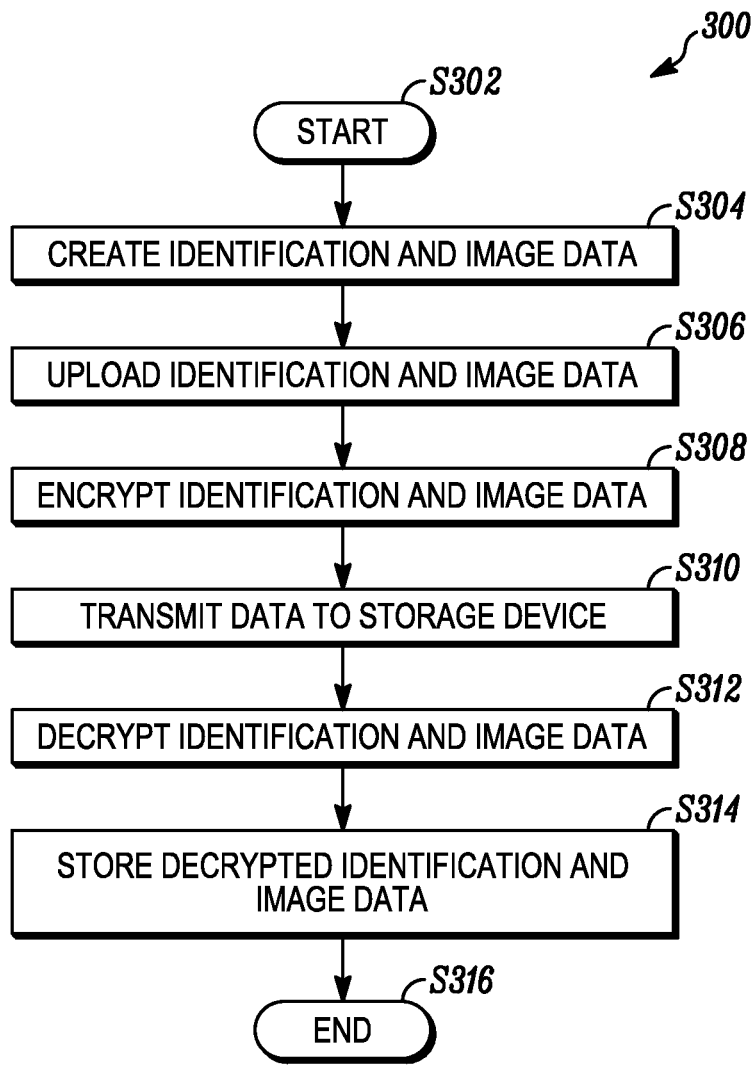
FIG. 3 illustrates an example tagging method.

The operation of example storage system 200 will now be further described with additional reference to FIG. 3.

FIG. 3 illustrates an example tagging method 300.

As shown in the figure, the method starts (S302), and a user creates identification and photo/video data (S304). For example, returning to FIG. 1, a user creating identification and photo/video data corresponds to a user using OVI 104 with item 102.

Once the identification and photo/video data has been created, a user will upload the data (S306). Uploading identification and photo/video data corresponds to a user sending identification data to secure hash function component 202 and photo/video data to encryptor 204 of FIG. 2.

Next, the identification and image data are encrypted (S308). This corresponds to encrypt component 210 encrypting identification data and encrypt component 216 encrypting photo/video data.

After the identification and photo/video data has been encrypted it is sent to a storage device (S310). Once received, the storage device decrypts the data (S312). The decryption of data corresponds to encrypted identification data being sent to decryption component 224 and encrypted photo/video data being sent to decryption component 222.

Next, the decrypted identification and image data are stored (314). The storage of identification and image data corresponds to controlling component 228 locating a user in user registration component 230 and finding the location of their storage space. Once the storage space is located, controlling component 228 instructs storage component 226 to store the decrypted identification and photo/video data in the designated location.

Once all identification and photo/video data are stored the process ends (S316).

Figure 4:
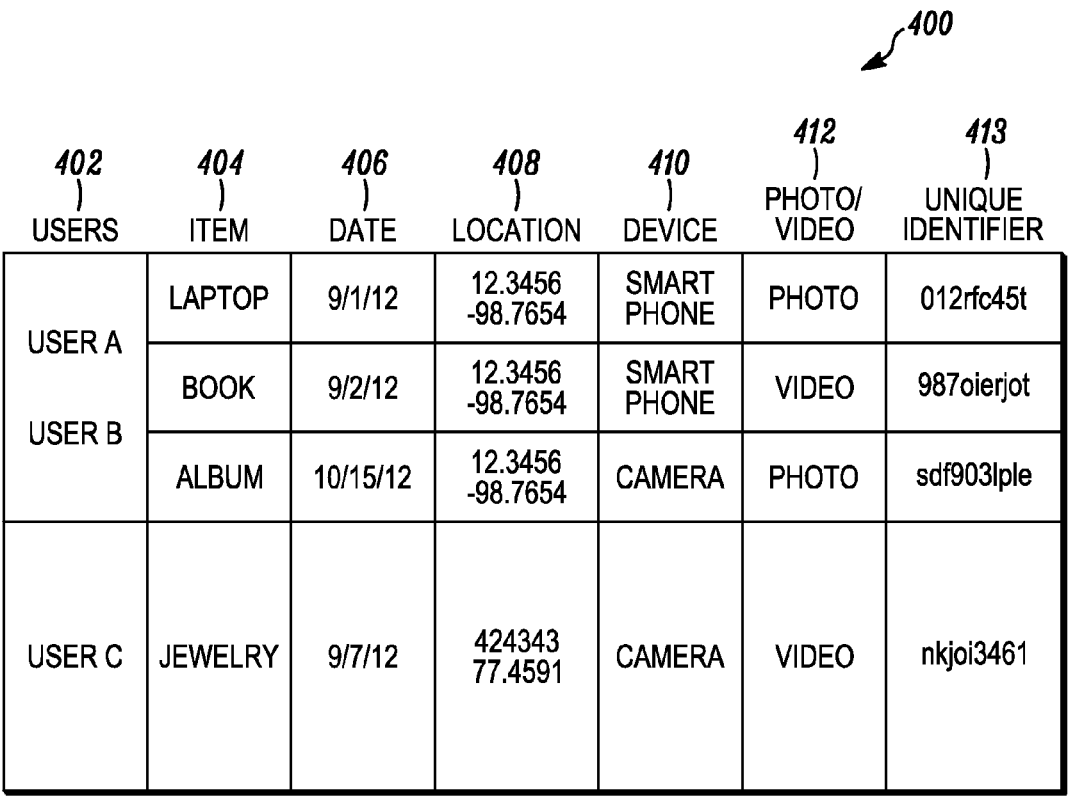
FIG. 4 illustrates an example storage table.

FIG. 4 illustrates an example storage table 400.

As illustrated in the figure, storage table 400 includes a unique device identifier column 413, user column 402, an item column 404, a date column 406, a location column 408, a device ID column 410 and a photo/video data column 412.

In operation, user A will input identification data as well as photo/video data into secure hash function component 202 and encryptor 204. The identification and photo/video data is encrypted and sent to storage device 206. Once the location of user A's storage space has been determined by controlling component 228, storage component 226 will begin storing the data within the table. Storage component 226 will first find the location of user A's storage space by locating the user A in user column 402.

User B also shares storage space with user A, this allows user A and user B to access the same storage space. In an example embodiment user A may be a client and user B may be an insurance company. In case of a fire, flood, or theft, for example, either party would have access to the documented items when filing insurance claims. Two shared users are described here for purposes of providing a simplified discussion. This is clearly a non-limiting example, as embodiments may include many shared users.

In another example embodiment, both parties would have to be present in order to access the documented items.

Once the user has been found, the type of item is stored in item column 404, in this example, the item is a book. The date that the photo/video data of the book was created is stored in date column 406 and the location of the book when the video or photo data was created is stored in location column 408. The type of device used to create the data is stored in device ID column 410. Finally, both photo/video data of the item may be stored in video or photo column 412, and a unique identifier may be stored in column 413.

Once all identification and photo/video data is stored in a row, User A may finish or move down to the next row and add another item to the table.

A benefit of a system and method in accordance with the present disclosure is that it is possible to document the unique identifier, time, date, location, and condition of many items and store data on a secure storage space. This would be very beneficial when trying to construct an insurance claim in the event of a fire or theft. Rather than having to recall everything lost or damaged, the data could simply be accessed from a secure storage space.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the system and method in accordance with the present disclosure in various embodiments and with various modifications as are suited to the particular use contemplated. It is intended that the scope of the system and method in accordance with the present disclosure be defined by the claims appended hereto.

What is claimed as new and desired to be protected by Letters Patent of the United States is:

1. A system comprising:
   one or more hardware processors; and
   a non-transitory computer-readable storage medium containing computer-executable instructions that when executed by the one or more hardware processors cause the one or more hardware processors to perform steps comprising:

receiving an image of a tangible item with an ownership verification indicator comprising a bar code or an RFID tag;

receiving item identification data associated with the tangible item, the item identification data comprising position data describing a geodetic position of the tangible item at a time when the image of the tangible item was captured;

storing the image and the item identification data as a documented item associated with a user;

generating a table that includes the stored documented item and additional documented items associated with the user in response to receiving a request for documented items associated with the user; and transmitting the generated table for display to the user.

2. The system of claim 1, wherein the item identification data is encrypted when received and of a first bit length and the computer-executable instructions further cause the one or more hardware processors to performs steps comprising decrypting the encrypted item identification data using a hash function lookup table, wherein the decrypted item identification data is of a second bit length that is greater than the first bit length.

3. The system of claim 1, wherein the image and the item identification data are stored in a portion of a storage component associated with the user, the additional documented items stored in the portion of the storage component.

4. The system of claim 1, wherein the stored documented item is associated with an additional user.

5. The system of claim 1, wherein the item identification data comprises a unique identifier associated with the tangible item.

6. The system of claim 1, wherein the item identification data comprises a date when the image of the tangible item was captured.

7. The system of claim 1, wherein the item identification data comprises information identifying a device used to generate the image.

8. The system of claim 1, wherein each additional documented item comprises an image of an additional tangible item and item identification data associated with the additional tangible item.

9. The system of claim 1, wherein the ownership verification indicator is unique to the user.

10. The system of claim 1, wherein for each documented item the table includes a row and the row includes an image of a tangible item, a date the image was captured, a location of the tangible item when the image was captured, and a unique identifier associated with the tangible item.

11. A method comprising:

receiving, by a storage system, an image of a tangible item with an ownership verification indicator comprising a bar code or an RFID tag;

receiving, by the storage system, item identification data associated with the tangible item, the item identification data comprising position data describing a geodetic position of the tangible item at a time when the image of the tangible item was captured;

storing, by the storage system, the image and the item identification data as a documented item associated with a user;

responsive to receiving a request for documented items associated with the user, generating, by the storage system, a table that includes the stored documented item and additional documented items associated with the user; and transmitting, by the storage system, the generated table for display to the user.

12. The method of claim 11, wherein the item identification data is encrypted when received and of a first bit length and the method further comprises decrypting the encrypted item identification data using a hash function lookup table, wherein the decrypted item identification data is of a second bit length that is greater than the first bit length.

13. The method of claim 11, wherein the image and the item identification data are stored in a portion of a storage component associated with the user, the additional documented items stored in the portion of the storage component.

14. The method of claim 11, wherein the ownership verification indicator is unique to the user.

15. The method of claim 11, wherein for each documented item the table includes a row and the row includes an image of a tangible item, a date the image was captured, a location of the tangible item when the image was captured, and a unique identifier associated with the tangible item.

16. A computer program product comprising a non-transitory computer-readable storage medium containing computer program code for:

receiving an image of a tangible item with an ownership verification indicator comprising a bar code or an RFID tag;

receiving item identification data associated with the tangible item, the item identification data comprising position data describing a geodetic position of the tangible item at a time when the image of the tangible item was captured;

storing the image and the item identification data as a documented item associated with a user;

responsive to receiving a request for documented items associated with the user, generating a table that includes the stored documented item and additional documented items associated with the user; and transmitting the generated table for display to the user.

17. The computer program product of claim 16, wherein the image and the item identification data are stored in a portion of a storage component associated with the user, the additional documented items stored in the portion of the storage component.

18. The computer program product of claim 16, wherein the item identification data comprises a date when the image of the tangible item was captured.

19. The computer program product of claim 16, wherein the item identification data comprises information identifying a device used to generate the image.

20. The computer program product of claim 16, wherein each additional documented item comprises an image of an additional tangible item and item identification data associated with the additional tangible item.

* * * * *